U S009213442B2

(12) United States Patent
Shimizu et al.

(10) Patent No.: US 9,213,442 B2
(45) Date of Patent: *Dec. 15, 2015

(54) ELECTRONIC UNDERLAY WITH WIRELESS TRANSMISSION FUNCTION

(71) Applicant: NITTO DENKO CORPORATION, Ibaraki-shi, Osaka (JP)

(72) Inventors: Yusuke Shimizu, Ibaraki (JP); Ryoma Yoshioka, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/361,996

(22) PCT Filed: Jan. 21, 2014

(86) PCT No.: PCT/JP2014/051027
§ 371 (c)(1),
(2) Date: May 30, 2014

(87) PCT Pub. No.: WO2014/136482
PCT Pub. Date: Sep. 12, 2014

(65) Prior Publication Data
US 2015/0035802 A1 Feb. 5, 2015

(30) Foreign Application Priority Data

Mar. 8, 2013 (JP) .................................. 2013-046609
Apr. 19, 2013 (JP) .................................. 2013-087941

(51) Int. Cl.
*G06F 3/042* (2006.01)
*G02B 26/08* (2006.01)
(Continued)

(52) U.S. Cl.
CPC ............ *G06F 3/042* (2013.01); *G02B 26/0875* (2013.01); *H04N 1/00* (2013.01); *G02B 6/122* (2013.01); *H04M 1/7253* (2013.01)

(58) Field of Classification Search
CPC .............. G06F 3/03545; G06F 3/042–3/0428; G06F 2203/04109
USPC ...................... 345/175, 179; 178/18.09, 19.01
See application file for complete search history.

(56) References Cited

U.S. PATENT DOCUMENTS 6,396,598 B1  5/2002  Kashiwagi et al.
2004/0164972 A1  8/2004  Carl
(Continued)

FOREIGN PATENT DOCUMENTS

CN  1614534 A  5/2005
CN  1734470 A  2/2006
(Continued)

OTHER PUBLICATIONS

English Translation of Written Opinion dated Mar. 4, 2014, issued in corresponding Application No. PCT/JP2014/051027 (4 pages).
(Continued)

*Primary Examiner* — Stephen Sherman
(74) *Attorney, Agent, or Firm* — Westerman, Hattori, Daniels & Adrian, LLP

(57) ABSTRACT

Provided is an electronic underlay with a wireless transmission function, designed not to sense a hand holding a writing tool at the time of writing on a sheet. The electronic underlay with a wireless transmission function can be laid under a sheet to perform writing with a writing tool. The electronic underlay is provided with: a sheet-like optical waveguide formed by sandwiching lattice-like cores between a sheet-like under cladding layer and a sheet-like over cladding layer; a light emitting element connected to one end surface of the core; a light receiving element connected to another end surface of the core; and wireless transmission means for wirelessly transmitting inputted letters as electronic data. An elasticity modulus of the core is larger than an elasticity modulus of the under cladding layer and the over cladding layer.

4 Claims, 2 Drawing Sheets

(51) Int. Cl.
*H04N 1/00* (2006.01)
*G02B 6/122* (2006.01)
*H04M 1/725* (2006.01)

(56) References Cited

U.S. PATENT DOCUMENTS

| | | | |
|---|---|---|---|
| 2008/0019616 | A1 | 1/2008 | Hotta et al. |
| 2010/0156848 | A1 | 6/2010 | Yatsuda et al. |
| 2010/0171717 | A1* | 7/2010 | Hu et al. .................. 345/173 |
| 2011/0079501 | A1 | 4/2011 | Arai |
| 2012/0327033 | A1 | 12/2012 | Shimizu et al. |
| 2013/0009911 | A1 | 1/2013 | Shibata et al. |
| 2013/0015334 | A1 | 1/2013 | Chen et al. |

FOREIGN PATENT DOCUMENTS

| | | | |
|---|---|---|---|
| CN | 1752994 | A | 3/2006 |
| CN | 1774690 | A | 5/2006 |
| CN | 1855010 | A | 11/2006 |
| CN | 102034765 | A | 4/2011 |
| CN | 102411433 | A | 4/2012 |
| CN | 102411458 | A | 4/2012 |
| CN | 102722284 | A | 10/2012 |
| CN | 102812503 | A | 12/2012 |
| CN | 102831391 | A | 12/2012 |
| CN | 102890565 | A | 1/2013 |
| JP | 61-188515 | A | 8/1986 |
| JP | 01-172916 | A | 7/1989 |
| JP | 02-115919 | A | 4/1990 |
| JP | 10-091348 | A | 4/1998 |
| JP | 2002-344641 | A | 11/2002 |
| JP | 2005-107804 | A | 4/2005 |
| JP | 3746378 | B2 | 2/2006 |
| JP | 2006-301979 | A | 11/2006 |
| JP | 2007-034907 | A | 2/2007 |
| JP | 2010-151992 | A | 7/2010 |
| JP | 2012-198301 | A | 10/2012 |
| JP | 2013-008138 | A | 1/2013 |
| WO | 2014/136471 | A1 | 9/2014 |
| WO | 2014/136472 | A1 | 9/2014 |
| WO | 2014/136508 | A1 | 9/2014 |

OTHER PUBLICATIONS

International Search Report, dated Mar. 4, 2014, issued in corresponding application No. PCT/JP2014/051027.
Search Report dated Feb. 25, 2015, issued in Chinese Patent Application No. 201480000284.2, with English translation (4 pages).
International Search Report, dated Mar. 4, 2014, issued in Application No. PCT/JP2014/051028. (5 pages).
International Search Report dated Mar. 4, 2014, issued in Application No. PCT/JP2014/51026. (3 pages).
English Translation of Written Opinion dated Mar. 4, 2014, issued in Application No. PCT/JP2014/051028 (4 pages).
Translation of Written Opinion dated Mar. 4, 2014, issued in Application No. PCT/JP2014/051026 (4 pages).
Non-Final Office Action dated Jul. 10, 2015, issued in U.S. Appl. No. 14/362,060 (20 pages).
Chinese Search Report dated Jun. 25, 2015, issued in application No. 201480000283.8 (w/English translation) (4 pages).
Extended European Search Report dated Oct. 27, 2015, issued in European Patent Application No. 14727698.4 (10 pages).
Extended European Search Report dated Oct. 27, 2015, issued in European Patent Application No. 14727699.2 (8 pages).
Extended European Search Report dated Oct. 27, 2015, issued in European Patent Application No. 14727700.8 (9 pages).
Wouters, et al., "Determining the Young's modulus and creep effects in three different photo definable epoxies for MEMS applications", Sensors and Actuators A: Physical, 2009, pp. 196-200. Cited in Extended European Search Reports dated Oct. 27, 2015 issued in counterpart application Nos. 14727700.8, 14727698.4 and 14727699.2.

* cited by examiner

ELECTRONIC UNDERLAY WITH WIRELESS TRANSMISSION FUNCTION

TECHNICAL FIELD

The present invention relates to an electronic underlay with a wireless transmission function, which can be laid under a sheet where an inspection record for equipment or an apparatus or the like is to be written, to wirelessly transmit the contents written on the sheet to a data center or the like as digital data (electronic data).

BACKGROUND ART

For example, in the case of inspecting gas equipment, electric equipment or the like in a house, a factory or the like, an inspector from an inspection company or the like visits a site with the presence of the equipment or the like to be inspected and performs inspection, and based on a result of the inspection, the inspector writes a check mark on each inspection item listed in a dedicated inspection record sheet or writes a comment on the sheet. Subsequently, the inspector returns to the inspection company or the like, and organizes the inspection result and arranges a necessary replacement part or the like.

Moreover, there has recently been performed for the purpose of digitization that the inspector carries a mobile terminal such as a notebook type personal computer or a tablet type terminal to the site, gets previously registered inspection items and the like displayed on a display of the mobile terminal, and inputs a check or a comment based on the inspection result (e.g., Patent Document 1). Using a wireless communication function of the mobile terminal, the inspection result is wirelessly transmitted as electronic data from the site to a data center or the like of the inspection company.

RELATED ART DOCUMENT

Patent Document

[Patent Document 1] Japanese Patent Application Laid-Open No. 2002-344641

SUMMARY OF THE INVENTION

In the inspection by means of the inspection record sheet, using the inspection record sheet as a transfer sheet allows a client who requests inspection to receive a copy sheet with the inspection result transferred thereto for confirmation in the site, whereas it is inefficient for the inspector because the inspector does some work such as organizing the inspection result after returning to the inspection company or the like.

On the other hand, in the inspection by means of the mobile terminal, the efficiency in organization of the inspection result and the like can be improved by digitization, but the client who requests inspection cannot receive a sheet with the inspection result recorded thereon in the site. The client receives the sheet later by mail or the like.

The present applicant has proposed and already filed an application of the invention which is related to a notebook device in which notes or the like can be written on a sheet, and the note or the like can also be digitized (Japanese Patent Application Laid-Open No. 2012-160160). The notebook device comprises an optical waveguide in a square frame shape, and allows light to travel in a lattice shape within the square frame. When the optical waveguide in the square frame shape is put on a bound sheet in a type of a notebook in which writing is to be performed with a writing tool and notes or the like are written with the writing tool in a portion of the sheet exposed from the inside of the square frame, a pen tip shades the light traveling in the lattice shape and a position of the pen tip is detected from the light shaded position, thereby to allow the written note or the like to be specified as electronic data. That is, the notebook device is to allow the note or the like written on the sheet to be left on the sheet, and also allow it to be formed into electronic data.

However, in the notebook device, when a little finger, its root portion (hypothenar) or the like of a hand holding the writing tool such as the pen comes into the square frame, that portion of the hand may also shade the lattice-like light and may thus be judged as a written note or the like and formed into electronic data. The electronic data of the portion of the hand is unnecessary.

The present invention was made in view of such circumstances, and has an object to provide an electronic underlay with a wireless transmission function, which is not one using light-shading as described above, but one using a change in light propagation of a core based on writing pressure that is applied to an optical waveguide by a writing tool such as a pen. For this reason, the electronic underlay is not one used by being put on a sheet as described above, but one used by being laid under the sheet, and designed not to sense an unnecessary portion such as a little finger, its root portion or the like of a hand holding the writing tool at the time of writing on the sheet with the writing tool. The electronic underlay is capable of writing on the sheet and simultaneously forming the written contents into electronic data to wirelessly transmit the electronic data.

In order to achieve the above object, an electronic underlay with a wireless transmission function according to the present invention is an electronic underlay which is used by being laid under a sheet to perform writing on with a writing tool. The electronic underlay comprises: a sheet-like optical waveguide in which a plurality of linear cores are arranged and formed in a lattice shape on the surface of a sheet-like under cladding layer, an over cladding layer is formed in a sheet shape in the state of covering these cores, and the surface of the over cladding layer is made a contact surface with the sheet; a light emitting element connected to one end surface of the core; a light receiving element connected to the other end surface of the core; movement locus specifying means for specifying a movement locus of a tip of a writing tool on the surface of the sheet by use of a light propagation amount of the cores which has been changed due to the movement; and wireless transmission means for wirelessly transmitting the specified movement locus as electronic data. An elasticity modulus of the core is larger than an elasticity modulus of the under cladding layer and an elasticity modulus of the over cladding layer, and in a state where the surface of the sheet is pressed by the tip of the writing tool, in a direction of the pressing, a deformation ratio of the core in a cross section is smaller than deformation ratios of the over cladding layer and the under cladding layer in cross sections.

It is to be noted that in the present invention, the "deformation ratio" refers to a ratio of an amount of change in a pressing direction in each of thicknesses of the core, the over cladding layer and the under cladding layer at the time of pressing with respect to each of those before pressing. Further, "movement" of the tip of the writing tool includes the case of a movement distance being 0 (zero), and a "movement locus" in that case is a point.

The electronic underlay with a wireless transmission function (hereinafter simply referred to as "electronic underlay") according to the present invention is provided with a sheet-like optical waveguide in which an elasticity modulus of a core is larger than an elasticity modulus of an under cladding layer and an elasticity modulus of an over cladding layer. Accordingly, when the surface of the over cladding layer in the optical waveguide is pressed, in a direction of the pressing, a deformation ratio of the core in a cross section is smaller than deformation ratios of the over cladding layer and the under cladding layer in cross sections, and a cross sectional area of the core is retained in the pressing direction. When a sheet is put on the surface of the over cladding layer in the optical waveguide and letters or the like are written on the sheet with a writing tool such as a pen, writing pressure by its tip (pen tip, or the like) and pressure by a portion of a hand holding the writing tool are transmitted to the over cladding layer via the sheet, and the surface of the over cladding layer is pressed. The pressing makes it possible that, at a portion pressed by the tip of the writing tool, bending of the core becomes steep along with the tip of the writing tool, and leakage (scattering) of light from the core occurs, and at a portion pressed by the portion of the hand holding the writing tool, bending of the core becomes gentle along the hand, and the leakage (scattering) of light does not occur. This then makes it possible that, as for the core pressed by the tip such as the pen tip, a light detection level (amount of received light) in a light receiving element decreases, and as for the core pressed by the portion of the hand holding the writing tool, a detection level does not decrease. A position (coordinates) of the tip such as the pen tip can be detected by the movement locus specifying means due to the decrease in the light detection level. The portion of the hand whose detection level does not decrease is in the same state as a state where it is not pressed, and it can thus be prevented from being sensed. Therefore, only a movement locus of the tip such as the pen tip (the information such as the letters having been written) can be detected. Then, the movement locus of the tip such as the pen tip can be wirelessly transmitted as electronic data by the wireless transmission means. That is, information such as letters written on the sheet can be left on the sheet and can also be wirelessly transmitted as electronic data to a data center or the like. Accordingly, for example in inspection of the equipment, an inspection record sheet with an inspection result written thereon can be passed to a client who requests inspection on the site, and the inspection result can also be efficiently organized.

Especially in the case that storage means for storing a movement locus of the tip of the writing tool as electronic data is comprised in the electronic underlay, information such as letters written on the sheet can be left not only on the sheet but also in the storage means as electronic data.

BRIEF DESCRIPTION OF THE DRAWINGS

FIG. 1 schematically shows one embodiment of an electronic underlay of the present invention, where

DESCRIPTION OF EMBODIMENTS

Next, embodiments of the present invention will be described in detail based on the drawings.

Figure 1A:
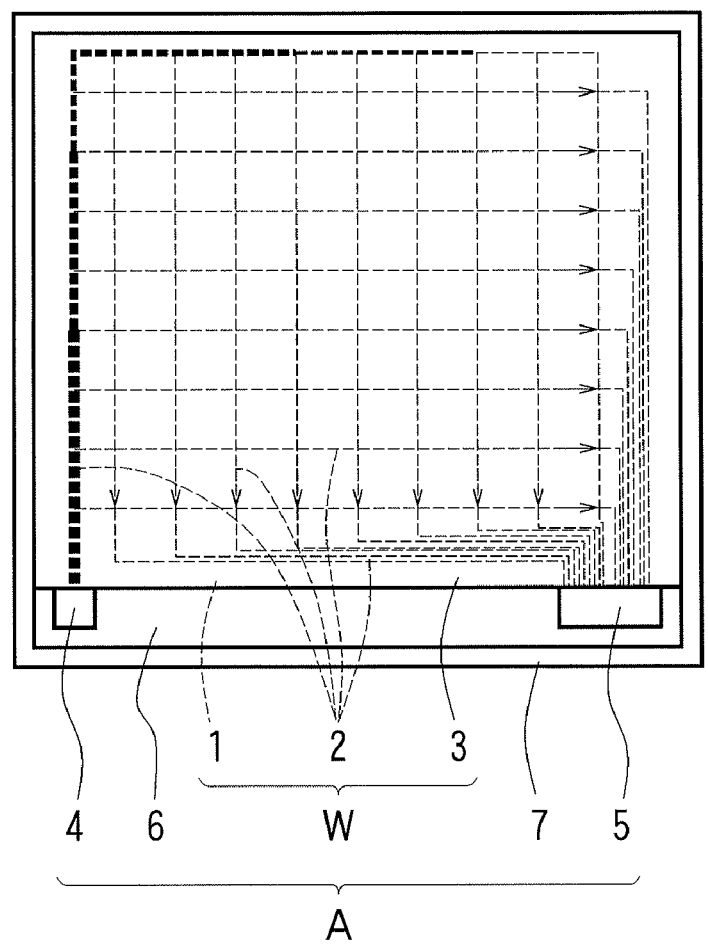
FIG. 1A is its plan view and FIG. 1B is its enlarged sectional view.
Figure 1B:
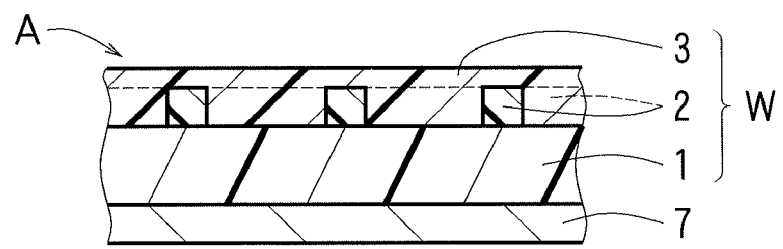

FIG. 1A is a plan view showing one embodiment of an electronic underlay of the present invention, and FIG. 1B is an enlarged view of a cross section of its center. An electronic underlay A of this embodiment comprises: a square sheet-like optical waveguide W formed by sandwiching lattice-like cores 2 between a square sheet-like under cladding layer 1 and a square sheet-like over cladding layer 3; a light emitting element 4 connected to one end surface of each of linear cores 2 constituting the lattice-like cores 2; a light receiving element 5 connected to the other end surface of the linear core 2; and a circuit board 6 mounted with the light emitting element 4, the light receiving element 5, wireless transmission means (not shown) such as an oscillator for wirelessly transmitting inputted letters or the like as electronic data, a CPU (central processing unit) (not shown) for controlling the electronic underlay A, and a battery (not shown) for supplying electricity to the light emitting element 4 and the like. In this embodiment, the optical waveguide W and the circuit board 6 are provided on the surface of a rigid plate 7 such as a resin plate or a metal plate. Then, light emitted from the light emitting element 4 passes through the core 2, and is received in the light receiving element 5. Further, in the optical waveguide W, an elasticity modulus of the core 2 is larger than an elasticity modulus of the under cladding layer 1 and an elasticity modulus of the over cladding layer 3. With this elasticity moduli, when the surface of the optical waveguide W is pressed, in the pressing direction, a deformation ratio of the core in a cross section 2 is made smaller than deformation ratios of the over cladding layer 3 and the under cladding layer 1 in cross sections.

It is to be noted that in FIG. 1A, the core 2 is indicated by a chain line, and a thickness of the core 2 is indicated by a thickness of the chain line. Further, in FIG. 1A, the cores 2 are illustrated in abbreviated number. Moreover, an arrow of FIG. 1A indicates a light travelling direction.

Figure 2:
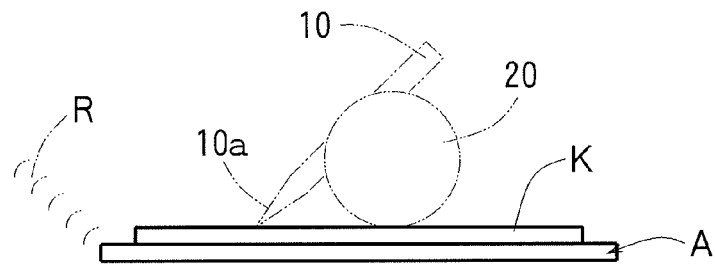
FIG. 2 is a side view schematically showing a service state of the electronic underlay.

As shown in the side view of FIG. 2, the electronic underlay A is used by being laid under a sheet K to write letters or the like on with a writing tool 10. At this time, the surface of the over cladding layer 3 [cf. FIGS. 3A and 3B] in the optical waveguide W of the electronic underlay A is the contact surface with the sheet K. Then, letters or the like are inputted by holding the writing tool 10 with a hand 20 and writing letters or the like on the surface of the sheet K with the writing tool 10. An input region on the sheet K is a portion corresponding to the lattice-like cores 2 (cf. FIG. 1A) in the optical waveguide W of the electronic underlay A.

Figure 3A:
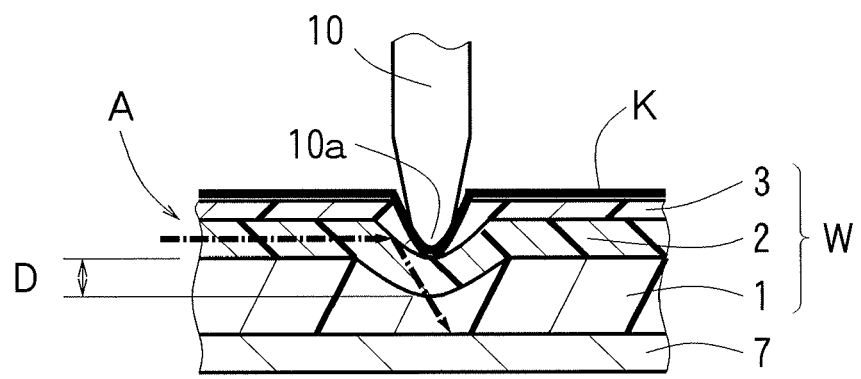
FIG. 3A is a sectional view schematically showing a state of an optical waveguide of the electronic underlay, pressed by a writing tool via a sheet.
Figure 3B:
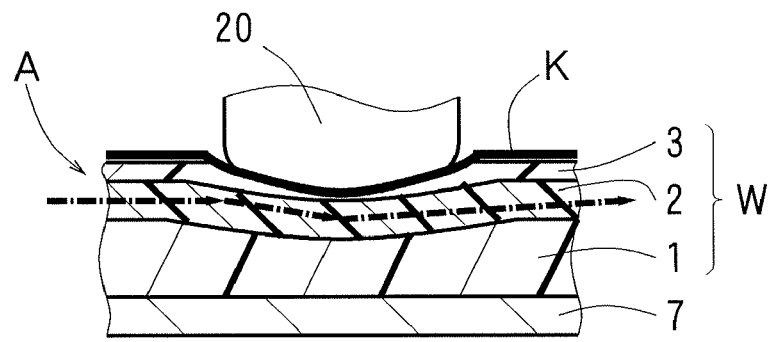
FIG. 3B is a sectional view schematically showing a state of the optical waveguide pressed by a hand via the sheet.

That is, as shown in the sectional views of FIGS. 3A and 3B, when information such as letters is inputted on the surface of the sheet K by writing it with the writing tool 10 such as a pen held in the hand 20 or by some other means, writing pressure by a tip 10a, such as a pen tip, and pressure by a little finger, its root portion (hypothenar) or the like of the hand 20 holding the writing tool 10, are transmitted to the over cladding layer 3 via the sheet K, and the surface of the over cladding layer 3 is pressed. Due to the pressing, on the cross section in the pressing direction, both in a portion pressed by the tip 10a such as the pen tip [cf. FIG. 3A] and a portion pressed by a portion of the hand 20 [cf. FIG. 3B], the over cladding layer 3 and the under cladding layer 1 having the smaller elasticity moduli are deformed so as to be crushed, and the core 2 having the larger elasticity modulus is bent so as to sink into the under cladding layer 1 along the tip 10a such as the pen tip and the portion of the hand 20, while retaining its cross sectional area.

Then, as shown in FIG. 3A, at the portion pressed by the tip 10a such as the pen tip, bending of the core 2 becomes steep since the tip 10a is sharp, and leakage (scattering) of light from the core 2 occurs [cf. two-dot chain line of FIG. 3A]. On the other hand, as shown in FIG. 3B, at the portion pressed by the hand 20 holding the writing tool 10, bending of the core 2 becomes gentle since the hand 20 is quite large and round as compared with the tip 10a of the writing tool 10, and leakage (scattering) of light does not occur (light travels within the core 2 without being leaked [cf. two-dot chain line of FIG. 3B]. This makes it possible that, as for the core 2 pressed by the tip 10a such as the pen tip, a light detection level in the light receiving element 5 decreases, and as for the core 2 pressed by the hand 20 holding the writing tool 10, a detection level does not decrease. Then, due to the decrease in light detection level, a position (coordinates) of the tip 10a such as the pen tip can be detected. The portion of the hand 20 whose detection level does not decrease is in the same state as a state where it is not pressed, and it is thus not sensed.

Thereat, the CPU of the electronic underlay A is incorporated with a program (movement locus specifying means) for specifying a movement locus of the tip 10a such as the pen tip from the decrease in light detection level in the light receiving element 5. That is, the electronic underlay A serves as a positional sensor for detecting the position of the tip (pen tip, etc.) 10a of the writing tool (pen, etc.) 10 that is used for inputting information. Then, data indicating the movement locus of the tip 10a of the writing tool 10 is wirelessly transmitted as electronic data to the data center or the like by the wireless transmission means such as the oscillator [cf. FIG. 2 (symbol R of FIG. 2 schematically shows a wireless radio wave).

As thus described, when information such as letters is written on the sheet K by use of the electronic underlay A, the information such as the letters can be left on the sheet K, and can also be wirelessly transmitted as electronic data to the data center or the like by the wireless transmission means such as the oscillator. For this reason, even when the sheet K with the information such as the letters written thereon is lost, its electronic data can be recorded (stored) in the data center or the like to which it has been wirelessly transmitted, and the electronic data can be reproduced as appropriate from where it is recorded (stored) according to the need.

Moreover, since the elasticity modulus of the core 2 is larger than the elasticity modulus of the under cladding layer 1 and the elasticity modulus of the over cladding layer 3 in the optical waveguide W, even when the optical waveguide W is pressed by the hand 20 holding the writing tool 10, only the position of the tip 10a such as the pen tip can be detected and the portion of the hand 20 can be prevented from being sensed as described above.

Further, at the time of inputting the sheet K, the portion of the optical waveguide W which is pressed by the tip 10a of the writing tool 10 via the sheet K is deformed as described above, thereby making writing performance favorable.

In addition, when the pressing by the tip 10a of the writing tool 10 is released (when the tip 10a moves or input such as writing is completed), the under cladding layer 1, the core 2, and the over cladding layer 3 return to their original states [cf. FIG. 1B] due to their own restoring force. A sinking depth D of the core 2 into the under cladding layer 1 is preferably up to 2000 μm at the maximum. When the sinking depth D exceeds 2000 μm, the under cladding layer 1, the core 2, and the over cladding layer 3 may not return to their original states or cracking may occur in the optical waveguide W.

As one of uses of the electronic underlay A as thus described, there can, for example, be cited a use in an inspection/maintenance operation of a gas equipment or electric equipment in a house, a factory or the like. That is, in a site with the presence of equipment or the like to be inspected, inspection is performed, and based on a result of the inspection, a check mark is written on each inspection item listed in a dedicated inspection record sheet or a comment is written on the sheet. At this time, the electronic underlay A is laid under the inspection record sheet (corresponding to the sheet K). Doing this can lead to writing a check or a comment on the inspection record sheet and simultaneously forming the check or the comment into electronic data to wireless transmit it to a data center or the like of an inspection company. This allows the client who requests inspection to receive the inspection record sheet for confirmation in the site, and simultaneously allows the inspection company to efficiently organize the electronic data based on the inspection result. Then, a replacement part or the like can be rapidly arranged according to the need. Further, as the electronic data is recorded on a long-term basis, the time of occurrence of breakdown can be expected from the electronic data.

It is to be noted that as for the inspection record sheet, the one having been used so far can be used. It is thus possible to easily obtain such an advantage as described above by use of the electronic underlay A. Moreover, it is preferable to provide a mark for positioning the inspection record sheet on the surface of the electronic underlay A such that the check or the comment is sensed at a proper position of the electronic underlay A.

Other than the above use, there can, for example, be cited a use in a questionnaire survey operation, and in that case, it is possible to form a result of the questionnaire survey into electronic data and transmit it to the data center or the like for rapid organization and totaling. Further, there can be cited a use associated with security, and in that case, it is possible to form a signature written on the sheet K into electronic data and transmit it to the data center or the like for rapid authorization of the signature. Moreover, there can be cited such a use as forming notes or the like written on the sheet K into electronic data, transmitting it to a terminal such as a personal computer (hereinafter referred to as "PC") at home, storing it into the PC or the like and making it displayed on a display of the PC or the like according to the need.

Here, a more detailed description will be given of the elasticity moduli and the like of the core 2, under cladding layer 1 and over cladding layer 3.

The elasticity modulus of the core 2 is preferably within a range of 1 GPa to 10 GPa, and more preferably within a range of 2 GPa to 5 GPa. When the elasticity modulus of the core 2 falls below 1 GPa, a cross sectional area of the core 2 may not be retained (the core 2 may collapse) caused by pressure of the tip 10a such as the pen tip due to the shape of the tip 10a, and there is a possibility that the position of the tip 10a cannot be properly detected. On the other hand, when the elasticity modulus of the core 2 exceeds 10 GPa, bending of the core 2 by pressure of the tip 10a may not become steep along the tip 10a, but may become gentle. For this reason, leakage (scattering) of light from the core 2 does not occur, causing the light detection level in the light receiving element 5 not to decrease, and hence there is a possibility that the position of the tip 10a cannot be properly detected. It is to be noted that a size of the core 2 is, for example, a thickness within a range of 5 to 100 μm and a width within a range of 5 to 500 μm.

The elasticity modulus of the over cladding layer 3 is preferably within a range of not lower than 0.1 MPa and lower than 10 GPa, and more preferably within a range of not lower than 1 MPa and lower than 5 GPa. When the elasticity modulus of the over cladding layer 3 falls below 0.1 MPa, the over cladding layer 3 is extremely soft and may thus be damaged by pressure of the tip 10a such as the pen tip due to the shape of the tip 10a, and the over cladding layer 3 is unable to protect the core 2. On the other hand, when the elasticity modulus of the over cladding layer 3 is not lower than 10 GPa, the over cladding layer 3 is not deformed as it collapses even by pressure of the tip 10a and the hand 20, causing the core 2 collapse, and hence there is a possibility that the position of the tip 10a cannot be properly detected. It should be noted that a thickness of the over cladding layer 3 is, for example, within a range of 1 to 200 μm.

The elasticity modulus of the under cladding layer 1 is preferably within a range of 0.1 MPa to 1 GPa, and more preferably within a range of 1 MPa to 100 MPa. When the elasticity modulus of the under cladding layer 1 falls below 0.1 MPa, the under cladding layer 1 is extremely soft and may thus not return to its original state after being pressed with the tip 10a such as the pen tip, and there is a possibility that the operation cannot be successively performed. On the other hand, when the elasticity modulus of the under cladding layer 1 exceeds 1 GPa, the under cladding layer 1 is not deformed as it collapses even by pressure of the tip 10a and the hand 20, causing the core 2 collapse, and hence there is a possibility that the position of the tip 10a cannot be properly detected. It should be noted that a thickness of the under cladding layer 1 is, for example, within a range of 20 to 2000 μm.

Examples of formation materials for the core 2, the under cladding layer 1 and the over cladding layer 3 include a photosensitive resin and a thermosetting resin, and the optical waveguide W can be produced by a manufacturing method in accordance with the formation materials. Further, a refractive index of the core 2 is larger than refractive indexes of the under cladding layer 1 and the over cladding layer 3. Each of the elasticity moduli and the refractive indexes can be adjusted, for example, by adjusting selection of the kind or a composition ratio of each formation material. It is to be noted that a rubber sheet may be used as the under cladding layer 1, and the core 2 may be formed in a lattice shape on the rubber sheet.

Further, an elastic layer such as a rubber layer may be provided on the rear surface of the under cladding layer 1 (between the under cladding layer 1 and the rigid plate 7). In this case, even when the restoring force of the under cladding layer 1, the core 2 and the over cladding layer 3 becomes weak or the under cladding layer 1 and the like are originally made of materials with weak restoring force, the weak restoring force can be supported using restoring force of the elastic layer, and their states can be returned to the original ones after pressure by the tip 10a of the writing tool 10 has been released.

Further, so that only the position of the tip 10a such as the pen tip is detected and the hand 20 holding the writing tool 10 such as the pen is not sensed, what is of importance is an amount of leakage (scattering) of light due to abrupt bending of the core 2 at a portion pressed by the tip 10a. Then, for example, when a refractive index difference Δ between the core 2 and the under cladding layer 1/the over cladding layer 3 is specified by use of a ratio A (=R/T) of a curvature radius R (unit: μm) of the tip 10a such as the pen tip to a thickness T (unit: μm) of the core 2, the maximum value Δmax of the refractive index difference Δ is as in Formula (1) below. That is, when the refractive index difference Δ is larger than this maximum value Δmax, even when pressing is performed by the tip 10a such as the pen tip, the amount of leakage (scattering) of light is small and the light detection level in the light receiving element 5 does not sufficiently decrease, thereby making it difficult to distinguish between the position of the tip 10a such as the pen tip and the position of the hand 20.

(Mathematical Formula 1)

$$\Delta max = 8.0 \times 10^{-2} - A \times (5.0 \times 10^{-4}) \tag{1}$$

On the other hand, the minimum value Δmin of the refractive index difference Δ is as in Formula (2) below. That is, when the refractive index difference Δ is smaller than this minimum value Δmin, leakage (scattering) of light occurs even at the portion pressed by the hand 20, thereby making it difficult to distinguish between the position of the tip 10a such as the pen tip and the position of the hand 20.

(Mathematical Formula 2)

$$\Delta min = 1.1 \times 10^{-2} - A \times (1.0 \times 10^{-4}) \tag{2}$$

For this reason, the refractive index difference Δ is preferably set to between the minimum value Δmin and the maximum value Δmax. Here, for example when it is assumed that the curvature radius R (unit: μm) of the tip 10a is within a range of 100 to 1000, the thickness T (unit: μm) of the core 2 is within a range of 10 to 100 and the ratio A is within a range of 1 to 100, the refractive index difference Δ is within a range of $1.0 \times 10^{-3}$ to $7.95 \times 10^{-2}$. It is to be noted that in the case of the ratio A exceeding 100, the minimum value Δmin is set to $1.0 \times 10^{-3}$ (fixed).

Another embodiment of the electronic underlay of the present invention includes, in the electronic underlay of the above embodiment, storage means such as a memory for recording (storing) a movement locus of (letters or the like inputted with) the tip 10a of the writing tool 10 as electronic data. The storage means is mounted on the circuit board 6. Portions other than this are similar to those of the above embodiment.

Since it is provided with the storage means, the electronic underlay of this embodiment can leave information such as notes, written on the sheet K, on the sheet K and can also store (record) it as electronic data into the storage means such as the memory. Then, information such as letters stored (recorded) in the storage means can be reproduced (displayed) using a reproduction terminal (PC, smart phone, tablet type terminal, etc.), and can further be stored into the reproduction terminal. In this case, the electronic data is transmitted to the reproduction terminal, for example, by connecting the reproduction terminal with the electronic underlay A through a connection cable such as a micro USB cable or by the wireless transmission means. It should be noted that storage (recording) into the memory as the storage means is, for example, performed in a general-purpose file format such as pdf.

It should be noted that, although the rigid plate 7 has been provided for supporting the optical waveguide W in each of the above embodiments, the rigid plate 7 may not be provided. In that case, input is performed in a state where the optical waveguide W of the electronic underlay A is placed on a hard flat-surface stand such as a table, or in some other state.

Next, an example will be described in conjunction with a comparative example. However, the present invention is not restricted to the example.

EXAMPLE

[Formation Material for Over Cladding Layer]

Component A: epoxy resin (EPOGOSEY PT., manufactured by Yokkaichi Chemical Company Ltd.) 30 parts by weight Component B: epoxy resin (EHPE3150, manufactured by Daicel Corporation) 70 parts by weight Component C: photoacid generator (CPI200K, manufactured by San-Apro Ltd.) 4 parts by weight Component D: ethyl lactate (manufactured by Wako Pure Chemical Industries, Ltd.) 100 parts by weight By mixing these components A to D, a formation material for the over cladding layer was prepared.

[Formation Material for Core]

Component E: epoxy resin (EHPE3150, manufactured by Daicel Corporation) 80 parts by weight Component F: epoxy resin (YDCN700-10, manufactured by NIPPON STEEL & SUMIKIN CHEMICAL CO., LTD.) 20 parts by weight Component G: photoacid generator (SP170, manufactured by ADEKA CORPORATION) 1 part by weight Component H: ethyl lactate (Wako Pure Chemical Industries, Ltd.) 50 parts by weight By mixing these components E to H, a formation material for the core was prepared.

[Formation Material for Under Cladding Layer]

Component I: epoxy resin (EPOGOSEY PT., manufactured by Yokkaichi Chemical Company Ltd.) 75 parts by weight Component J: epoxy resin (JER1007, manufactured by Mitsubishi Chemical Corporation) 25 parts by weight Component K: photoacid generator (CPI200K, manufactured by San-Apro Ltd.) 4 parts by weight Component L: ethyl lactate (Wako Pure Chemical Industries, Ltd.) 50 parts by weight By mixing these components I to L, a formation material for the under cladding layer was prepared.

[Production of Optical Waveguide]

Using the above formation material for the over cladding layer, an over cladding layer was formed on the surface of a glass substrate by spin coating. This over cladding layer had a thickness of 5 µm, an elasticity modulus of 1.2 GPa and a refractive index of 1.503.

Subsequently, using the above formation material for the core, a core was formed on the surface of the over cladding layer by a photolithography method. This core had a thickness of 30 µm, a width of its lattice-like portion of 100 µm, a pitch of 600 µm, an elasticity modulus of 3 GPa and a refractive index of 1.523.

Next, using the above formation material for the under cladding layer, an under cladding layer was formed on the surface of the over cladding layer by spin coating so as to cover the core. This under cladding layer had a thickness (thickness from the surface of the over cladding layer) of 200 µm, an elasticity modulus of 3 MPa and a refractive index of 1.503.

Then, there was prepared one obtained by adhering a double sided tape (thickness: 25 µm) to one surface of a PET substrate (thickness: 1 mm). Subsequently, the other adhesive surface of the double sided tape was made to adhere to the surface of the under cladding layer, and in that state, the over cladding layer was separated from the glass substrate.

COMPARATIVE EXAMPLE

[Formation Material for Over Cladding Layer]

Component M: epoxy resin (EPOGOSEY PT, manufactured by Yokkaichi Chemical Company Ltd.) 40 parts by weight Component N: epoxy resin (2021P, manufactured by Daicel Corporation) 60 parts by weight Component O: photoacid generator (SP170, manufactured by ADEKA CORPORATION) 4 parts by weight By mixing these components M to O, a formation material for the over cladding layer was prepared.

[Formation Material for Core]

Component P: epoxy resin (EPOGOSEY PT, manufactured by Yokkaichi Chemical Company Ltd.) 30 parts by weight Component Q: epoxy resin (EXA-4816, manufactured by DIC Corporation) 70 parts by weight Component R: photoacid generator (SP170, manufactured by ADEKA CORPORATION) 4 parts by weight By mixing these components P to R, a formation material for the core was prepared.

[Formation Material for Under Cladding Layer]

Component S: epoxy resin (EPOGOSEY PT, manufactured by Yokkaichi Chemical Company Ltd.) 40 parts by weight Component T: epoxy resin (2021P, manufactured by Daicel Corporation) 60 parts by weight Component U: photoacid generator (SP170, manufactured by ADEKA CORPORATION) 4 parts by weight By mixing these components S to U, a formation material for the under cladding layer was prepared.

[Production of Optical Waveguide]

In the same manner as in the above example, an optical waveguide having the same size was prepared. However, an elasticity modulus of the over cladding layer was 1 GPa, that of the core was 25 MPa, and that of the under cladding layer was 1 GPa. Further, a refractive index of the over cladding layer was 1.504, that of the core was 1.532, and that of the under cladding layer was 1.504.

[Production of Electronic Underlay]

A light emitting element (XH85-S0603-2s, manufactured by Optowell Co., Ltd.) was connected to one end surface of the core in the optical waveguide of each of the above example and the comparative example. A light receiving element (s10226, manufactured by Hamamatsu Photonics K.K.) was connected to the other end surface of the core. A circuit, mounted with the light emitting element, the light receiving element, a CPU for controlling the electronic underlay, an oscillator, and the like, was provided to produce the electronic underlay of each of the example and the comparative example.

[Confirmation of Operation of Electronic Underlay]

A sheet was put on the surface of the over cladding layer in the optical waveguide of the electronic underlay, and a data inputting person held a ballpoint pen (curvature radius of a pen tip: 350 µm) in his or her hand and wrote letters on the sheet.

Then, electronic data wirelessly transmitted from the electronic underlay was displayed on a display of a PC wirelessly connected with the electronic underlay. As a result, as for the data formed by the electronic underlay of the example, only the letters written on the sheet were displayed. As opposed to this, as for the data formed by the electronic underlay of the comparative example, not only the letters written on the sheet but also a portion of the hand holding the ballpoint pen was displayed on the display.

From this result, it is found that only information written on the sheet can be detected and unnecessary information cannot be detected in the electronic underlay of the example.

Although the specific form in the present invention has been shown in the above example, the above example is mere exemplification, and should not be restrictively interpreted. A variety of modifications apparent to the skilled person in the art are intended to be within the scope of the present invention.

The electronic underlay of the present invention is usable for writing information such as letters on a sheet and simultaneously transmitting the information such as the letters as electronic data.

EXPLANATION OF REFERENCES

A electronic underlay
W optical waveguide
1 under cladding layer
2 core
3 over cladding layer
4 light emitting element
5 light receiving element

The invention claimed is:

1. An electronic underlay with a wireless transmission function comprising:
   a sheet-like optical waveguide in which a plurality of linear cores are arranged and formed in a lattice shape on the surface of a sheet-like under cladding layer, an over cladding layer is formed in a sheet shape covering the plurality of linear cores, and the surface of the over cladding layer is a contact surface for a sheet;
   a light emitting element connected to a first end surface of the plurality of linear cores;
   a light receiving element connected to a second end surface of the plurality of linear cores;
   movement locus specifying means for specifying a movement locus of a tip of a writing tool on a surface of the sheet based on a light propagation amount of the plurality of linear cores which has been changed due to the movement; and
   wireless transmission means for wirelessly transmitting the specified movement locus as electronic data,
   wherein an elasticity modulus of the plurality of linear cores is larger than an elasticity modulus of the under cladding layer and an elasticity modulus of the over cladding layer,
   wherein, in a state where the surface of the sheet is pressed by the tip of the writing tool, in a direction of the pressing, a deformation ratio of the plurality of linear cores in a cross section is smaller than deformation ratios of the over cladding layer and the under cladding layer in a cross section, and
   wherein the electronic underlay is capable of being laid under the sheet to perform writing with the writing tool.

2. The electronic underlay with a transmission function according to claim 1, further comprising storage means for storing the movement locus of the tip of the writing tool as electronic data.

3. The electronic underlay with a transmission function according to claim 1, wherein the elasticity modulus of the plurality of linear cores is within a range of 1 GPa to 10 GPa.

4. The electronic underlay with a transmission function according to claim 1, wherein the elasticity modulus of the over cladding layer is within a range of not lower than 0.1 MPa and lower than 10 GPa, and the elasticity modulus of the under cladding layer is within a range of 0.1 MPa to 1 GPa.

* * * * *